United States Patent [19]
Hoyt, III et al.

[11] Patent Number: 5,139,460
[45] Date of Patent: Aug. 18, 1992

[54] FLEXIBLE COUPLINGS WITH END FLOAT LIMITING

[76] Inventors: Raymond E. Hoyt, III, 26602 Via Gaviota, Mission Viejo, Calif. 92691; Jerry L. Hauck, 16548 San Andres, Fountain Valley, Calif. 92703; Tom Artunian, 16291 Sundance La., Huntington Beach, Calif. 92649

[21] Appl. No.: 438,093

[22] Filed: Nov. 16, 1989

[51] Int. Cl.⁵ .............................. F16D 3/54; F16D 3/72
[52] U.S. Cl. ........................................ 464/88; 464/154; 464/901
[58] Field of Search ............ 464/73, 74, 75, 76, 464/87, 88, 149, 153, 154, 173, 901

[56] References Cited
U.S. PATENT DOCUMENTS

| | | | |
|---|---|---|---|
| 2,213,277 | 9/1940 | Guy | 464/73 |
| 2,301,659 | 11/1942 | Ricefield | 464/73 |
| 2,502,790 | 4/1950 | Jencick | 464/73 |
| 2,629,991 | 3/1953 | Guy | 464/73 |
| 2,655,798 | 10/1953 | Neher | 464/154 |
| 3,313,124 | 4/1967 | Filepp | 464/88 X |
| 3,362,191 | 1/1968 | Louette | 464/88 X |
| 3,410,112 | 11/1968 | Gawreliuk | 464/73 |
| 4,662,859 | 5/1987 | Sakai et al. | 464/154 X |

FOREIGN PATENT DOCUMENTS 839967  4/1949  France ............................ 464/154

Primary Examiner—Daniel P. Stodola
Assistant Examiner—William G. Battista, Jr.
Attorney, Agent, or Firm—Price, Gess & Ubell

[57] ABSTRACT

A flexible coupling of the type having hubs secured to aligned shafts and connected to one another through the use of a belt surrounding the hubs and engaging teeth on the hubs is improved by forming projections on the interior of the belt which engage complementary receptacles on the hub teeth to prevent the hubs from moving apart in the direction transverse to their rotation.

2 Claims, 2 Drawing Sheets

FLEXIBLE COUPLINGS WITH END FLOAT LIMITING

BACKGROUND OF THE INVENTION

1. Field of the Invention

The invention set forth in this specification pertains to new and improved flexible couplings and, more particularly, to such couplings having an end float limiting feature.

2. Description of Related Art

Flexible couplings have probably been used since shortly after the advent of the modern machine age for the purpose of transmitting rotation from one shaft to another. These couplings are normally used in order to accommodate comparatively minor shaft alignment problems such as are occasionally encountered because of manufacturing or assembly errors. Because of the fact that these devices are widely used and have been known and used for many years, many different types of flexible couplings have been proposed, built, and used.

The particular flexible couplings of the type to which this invention pertains have been manufactured in the past so as to include two hubs or hub elements which are adapted to be connected to the shafts joined by the coupling. These hubs are each provided with extending lugs, teeth, or ribs serving as holding means so as to be engaged by corresponding projections on a band-like motion transmitting means in order to cause the hubs to rotate in synchronism as one of the shafts is rotated. The bands used in these prior couplings have been flexible, somewhat resilient bands capable of being wrapped around the hubs so that the projections on them engage the holding means on the hubs.

In various such couplings, there is a tendency for the couplings to pull apart as a result of torques generated during their use. This tendency may be referred to as "end float." This phenomenon is not a serious problem in many applications where the shafts joined by the couplings are in a relatively fixed relation. However, where there is a risk that such shafts may also move apart, there is an attendant risk that the entire coupling can come apart with potentially catastrophic consequences, given the high RPMs and high forces often involved.

SUMMARY OF THE INVENTION

As a consequence of these factors, there is a need for a new and improved flexible coupling which can resist or overcome the end float problem. Such a solution is complicated by the fact that the operation of the coupling must not be impaired and that any design should not introduce manufacturing complications and added cost. Additionally, simplicity of installation and long life desirably should be maintained.

In accordance with this invention, these various objectives are achieved by providing a flexible coupling for connecting two rotatable shafts, said coupling including: (1) two hubs, one of said hubs being capable of being connected to one of said shafts and the other of said hubs being capable of being connected to the other of said shafts, each of said hubs including holding means accessible from the periphery thereof capable of being engaged so as to cause said hubs and said shafts to rotate in synchronism for use in transmitting rotation from one of said hubs to the other of said hubs; (2) motion transmitting means extending generally between said hubs and engaging said holding means on both of said hubs for use in cooperation with said holding means in transmitting rotation from one of said hubs to the other of said hubs; and (3) retaining means positioned around said transmitting means for use in holding said motion transmitting means in contact with said holding means during use of said coupling in which the improvement comprises: projection means on the interior of the motion transmitting means for engaging receptacles in the holding means to limit transverse movement of the hubs with respect to one another in the coupled state.

An end float limiting function is thus provided which contributes to safe and secure operation and which is relatively economical to manufacture and easy to use.

BRIEF DESCRIPTION OF THE DRAWINGS

The just-summarized invention will now be more fully explained with reference to the accompanying drawings, of which.

Figure 1:
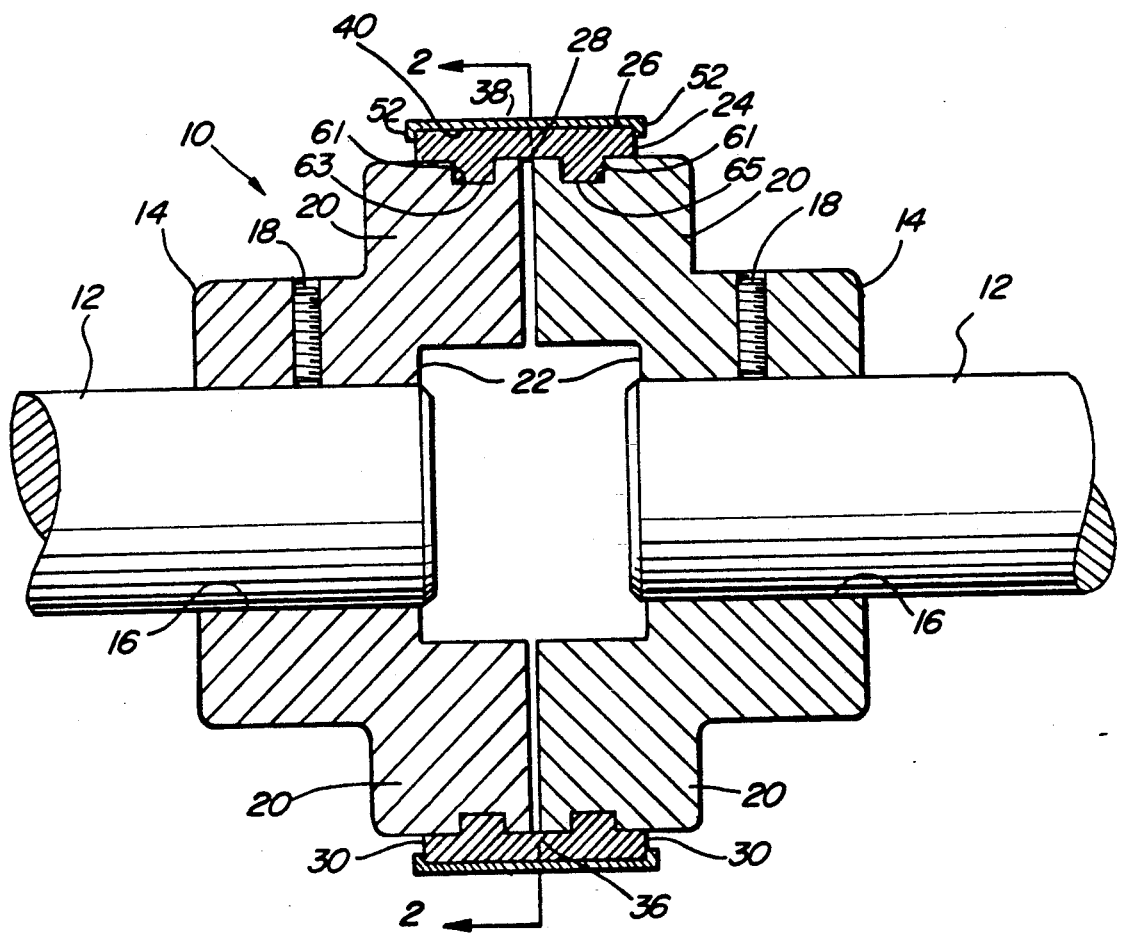
FIG. 1 is cross-sectional view of a flexible coupling in accordance with the preferred embodiment.

The particular couplings illustrated in the accompanying drawing are constructed so as to embody the concepts and teachings of this invention summarized and defined in the appended claims. Since these concepts and features may be utilized in a variety of somewhat differently appearing and differently constructed flexible couplings through the use of ordinary mechanical engineering skill on the basis of the disclosure embodied in this specification and the accompanying drawing, the invention is not to be considered as being limited to the precise structures illustrated in the drawings and described herein.

DETAILED DESCRIPTION OF THE PREFERRED EMBODIMENTS

In the drawing there is shown a flexible coupling 10 which is normally utilized to mechanically connect two aligned or substantially aligned shafts 12. The coupling 10 includes two separate, identical cylindrical hubs 14 These hubs 14 are provided with centrally located shaft openings 16 which accommodate the shafts 12. These hubs 14 may be secured to the shafts 12 through the use of conventional set screws 18 on the hubs 14 or in other conventional manners well-known in the field. Normally, the precise methods of securing the hubs 14 to the shafts 12 will be dependent upon the size of the coupling 10 and the sizes of the shaft 12 with which it is to be used. If desired, the two openings 16 in the two hubs 14 may differ in dimension so as to accommodate shafts 12 of a different dimension.

Figure 3:
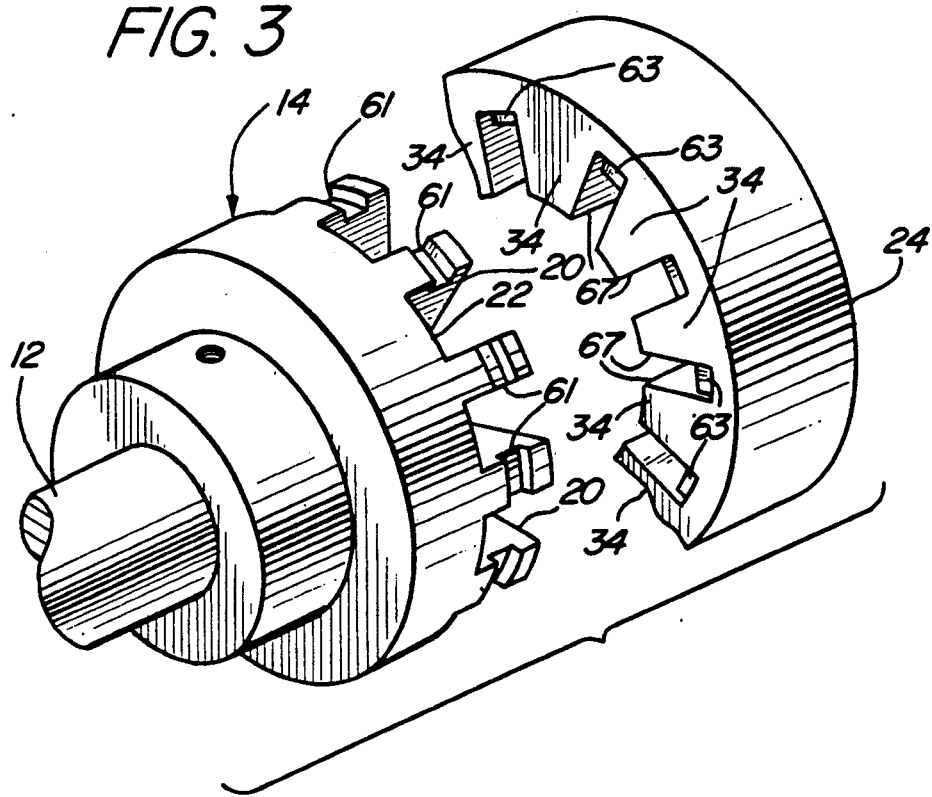
FIG. 3 is a partial sectional perspective view of a hub and belt according to the preferred embodiment.

When these hubs 14 are mounted as shown they are either in axial alignment or are nearly in axial alignment, and they are located on the shafts 12 so that projecting teeth or lugs 20 (which, as subsequently described, serve as holding means) located on their adjacent ends 22 extend generally towards one another. These teeth 20 will normally be spaced a short distance from one another so as to avoid their periodically abutting against one another in the event the shafts 12 are not in precise alignment. During installation of the coupling 10 the teeth 20, extending from annular surfaces, e.g., 21, FIG. 3, on the adjacent ends 22 will be brought into alignment with one another through the rotation of one or the other of the shafts 12 as a belt 24 serving as a motion transmitting means is assembled on the hubs 14. As may be seen, e.g., in FIG. 3, the outer surfaces of teeth 20 are extensions of the generally cylindrical outer surface 101 of hubs 14.

This belt 24 is preferably formed out of a somewhat flexible, somewhat resilient material capable of transmitting a significant rotational force from one of the hubs 14 to the other during the use of the coupling 10. Presently preferred results are achieved by forming the belt 24 out of an appropriate polyurethane having the physical properties indicated. It has been found that a urethane material is particularly desirable because it will give or flex sufficiently to accommodate minor misalignment of the shafts 12 without affecting its ability to be utilized over a long period.

Figure 2:
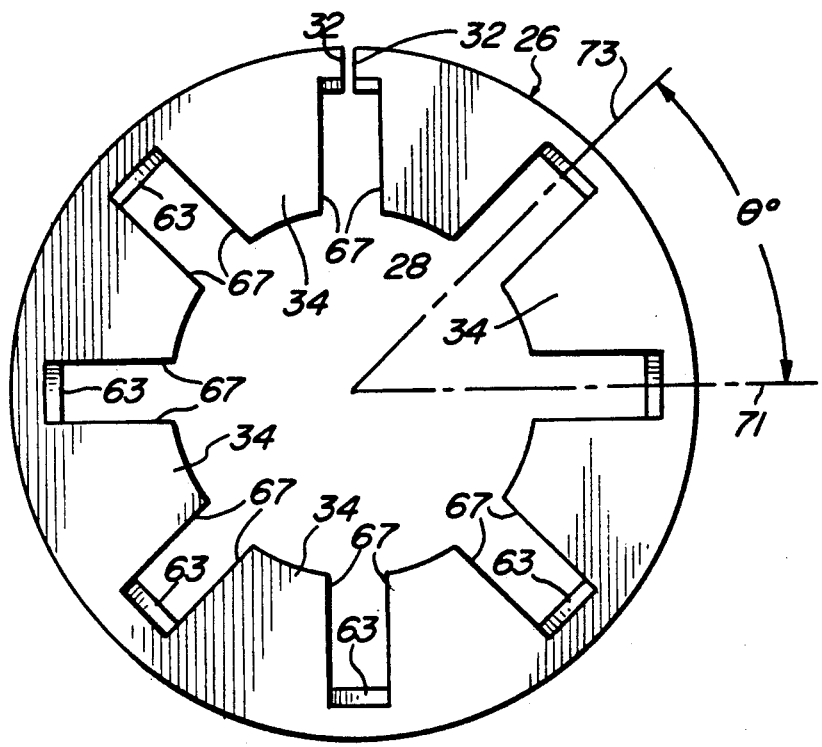
FIG. 2 is a side plan view of a flexible belt employed according to the preferred embodiment.

As formed, this belt 24 has a generally cylindrical exterior 26, an interior 28, sides or side edges 30, and ends 32 (FIG. 2). The belt 24 will normally be just sufficiently long so that the ends 32 will not quite meet when the belt 24 is located around the teeth 20, as shown. When the belt 24 is in this position, truncated wedge-shaped projections 34 on its interior 28 extend between the teeth 20 on the hubs 14, as shown, so as to fit closely with respect to all of these teeth 20. These projections 34 can be considered as interior engagement means on the belt 24 which are employed for the purpose of engaging the teeth 20 so as to transmit rotation from one of the hubs 14 to the other of the hubs 14.

As shown, each tooth 20 of each hub 14 of the preferred embodiment has a receptacle or channel 61 therein of substantially rectangular cross-section. First and second complementary projections 63, 65 of rectangular cross-section are formed on the interior 28 of the belt 24. As may be seen particularly in FIGS. 2 and 3, the projections 63, 65 lie in the spaces between the sidewalls 67 which define the wedge-shaped projections 34 of the belt 24. The projections 63, 65 are integrally formed with the belt 24 and, hence, require no additional manufacturing steps other than defining their desired shape in conventional molding apparatus.

As shown in FIG. 1, the rectangular cross-sections 63, 65 are positioned on the interior 28 of the belt 24 equidistant from a plane bisecting the cylindrical outer surface 26 of the belt 24. A projection 63, 65 thus engages each tooth 20 in the preferred embodiment, although it could be possible to vary the number of engaged teeth 20, as a particular design might dictate. As those skilled in the art will appreciate, the number of teeth 20 may also vary with the design, the particular embodiment of FIG. 2 employing eight teeth 20 per hub 14 such that the angle $\theta$ between radial lines 71, 73 bisecting adjacent projections 63 is 45 degrees.

A metal band 38 is used to retain the belt 24. The interior 40 of the band 38 is shaped and dimensioned so that the band 38 may be slid axially relative to the hubs 14 during the assembly and disassembly of the coupling 10 so that the band 38 fits over the belt 24, as shown, when the coupling is assembled so as to conform closely to the exterior 26 of the belt 24 when the belt is installed.

In the coupling 10, the interior 40 of the band 38 is cylindrical and is provided with very small terminal, inwardly projecting flanges 52 of smaller diameter than the remainder of the interior 40. These flanges 52 are each generally rectangular in cross-section. In the coupling 10, the sides 30 of the belt 24 fit between these flanges 52, and the exterior 26 is flat prior to the use of the belt 24 and takes on a cylindrical shape when the belt 24 is used. As a consequence of this structure, when the coupling 10 is employed, the belt 24 will be held in place by being expanded through centrifugal force into contact with the interior 40 of the band 38 generally between the flanges 52. This coupling 10 may be assembled and disassembled in substantially the manner indicated in the preceding discussion. It will be recognized, however, that a certain minimum difficulty will be encountered in moving the band 38 relative to the belt 24.

When the coupling 10 is not being rotated, it is possible to remove the band 38 by pushing or pounding on it so as to tend to force the belt 24 closely into engagement with the hubs 14 and the teeth 20 to a sufficient extent to permit the band 38 to be slid axially from the belt 24. At this point the belt 24 can be peeled from the hubs 14 while disassembling the coupling 10. As a consequence of the manner in which the band 38 fits with respect to the belt 24, there is no necessity to worry about the precise alignment of a pin or projection with a slot or cavity, as the coupling 10 is assembled by a series of steps which will be obvious from the preceding discussion.

The exterior 26 of the belt 24 may be bowed between the sides 30 so that the medial portion 36 of the belt 24 is of a larger diameter when the belt 24 is used in the coupling 10 than either of the sides 30. In such case, it can be considered that the belt 24 has an outwardly convex shape and that the exterior 26 of it is of uniform cross-sectional configuration throughout the length of this belt 24. The medial portion 36 of this belt 24 may be considered as an exterior engagement means because the shape of this medial portion 36 is important in connection with a metal or other nonelastic retainer band or means 38 used with the coupling 10.

The configuration of this interior portion is such that it is complementary to the exterior 26 of the belt 24. In effect, this interior may be referred to as concave, while the exterior 26 of the belt 24 may be referred to as convex. In any event, because of these complementary configurations of the exterior 26 of the belt 24 and the interior 40 of the band 38, during the use of the coupling the band 38 will be engaged so that it cannot slide off of the belt 24, while concurrently the belt will be held so that it cannot disengage the teeth from the hub 14.

What is claimed is:

1. A flexible coupling comprising:

first and second hubs having a central axis and an annular cross-section, each terminating in respective first and second substantially flat annular surfaces;

first and second pluralities of teeth integrally formed with and extending respectively from each of said first and second annular surfaces, the teeth being equally spaced around the circular periphery of each said annular surface, each tooth having an outer surface contoured to lie on the surface of a common cylinder, and a receptacle formed in each said outer surface;

a split, flexible belt having a cylindrical outer surface and an inner periphery, said belt being removably wrapped about said first and second hubs and having a plurality of wedge-shaped projections formed around the inner periphery thereof, each wedge-shaped projection being separated from an adjacent wedge-shaped projection by an opening, each said opening receiving a tooth of said first plurality of teeth and a tooth of said second plurality of teeth, said belt being of a width such that the teeth of said first plurality do not contact the teeth of said second plurality;

said belt further including first and second projection means in each said opening for releasably mating respectively with the receptacle of a tooth of said first plurality of teeth and the receptacle of a tooth of said second plurality of teeth for limiting motion of said first and second hubs substantially parallel to said central axis; and an endless metal retainer band mounted adjacent said belt.

2. The flexible coupling of claim 1 wherein each said projection means comprises a projection member of rectangular cross-section and wherein each said receptacle comprises a channel of rectangular cross-section, each channel extending entirely through its respective tooth and tangential to said common cylinder and transverse to the axis thereof.

* * * * *